(12) United States Patent
Berhault et al.

(10) Patent No.: US 10,740,528 B2
(45) Date of Patent: Aug. 11, 2020

(54) METHOD OF GENERATING A 3D CIRCUIT LAYOUT FROM A 2D CIRCUIT LAYOUT

(71) Applicant: Commissariat à l'Éngergie Atomique et aux Énergies Alternatives, Paris (FR)

(72) Inventors: Guillaume Berhault, Grenoble (FR); Olivier Billoint, Grenoble (FR); Sébastien Thuries, Grenoble (FR)

(73) Assignee: Commissariat àl' Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 16/027,545

(22) Filed: Jul. 5, 2018

(65) Prior Publication Data

US 2019/0012420 A1 Jan. 10, 2019

(30) Foreign Application Priority Data

Jul. 5, 2017 (FR) ...................................... 17 56352

(51) Int. Cl.
*G06F 30/392* (2020.01)
*G06F 119/18* (2020.01)

(52) U.S. Cl.
CPC ........ *G06F 30/392* (2020.01); *G06F 2119/18* (2020.01)

(58) Field of Classification Search
CPC ............. G06F 17/5072; G06F 2217/12; G06F 2119/18; G06F 30/392
See application file for complete search history.

(56) References Cited

U.S. PATENT DOCUMENTS

| 8,710,671 | B2 | 4/2014 | Bobba et al. | |
| 2009/0055789 | A1* | 2/2009 | McIlrath | G06F 17/5045 716/122 |
| 2016/0328510 | A1* | 11/2016 | Ueberreiter | G06F 17/5072 |
| 2017/0256446 | A1* | 9/2017 | Cha | G06F 17/5072 |

OTHER PUBLICATIONS

French Search Report for Application No. FR 1756352 dated Mar. 5, 2018.
[No Author Listed], Partition Problem. Wikipedia. Jun. 17, 2017;8 pages.
Billoint et al., A Comprehensive Study of Monolithic 3D Cell on Cell Design Using Commercial 2D Tool. Design, Automation & Test in Europe Conference & Exhibition. 2015;1192-6.

(Continued)

*Primary Examiner* — Vuthe Siek
(74) *Attorney, Agent, or Firm* — Wolf, Greenfield & Sacks, P.C.

(57) ABSTRACT

A method of generating, by a computing device, a 3D circuit layout based on a 2D circuit layout, the method comprising: assigning cells of first and second groups of circuit cells of the 2D circuit layout to first and second levels of the 3D circuit layout, the assignment of each circuit cell of the first and second groups being performed by: selecting, among at least one first row of a first level of the 3D circuit layout and at least one second row of a second level of the 3D circuit layout, the row having the greatest available space; and assigning the circuit cell to the selected row; and transmitting the 3D circuit layout to a manufacturing plant for fabrication.

15 Claims, 4 Drawing Sheets

(56) References Cited

OTHER PUBLICATIONS

Chow et al., Cell Density-driven Detailed Placement with Displacement Constraint. ISPD'14. Mar. 30-Apr. 12, 2014;3-10.
Cong et al., Thermal-Aware 3D IC Placement via Transformation. IEEE. 2007;780-5.
Panth et al., Placement-Driven Partitioning for Congestion Mitigation in Monolithic 3D IC Designs. ISPD'14. Mar. 30-Apr. 12, 2014;47-54.

* cited by examiner

METHOD OF GENERATING A 3D CIRCUIT LAYOUT FROM A 2D CIRCUIT LAYOUT

This application claims the priority benefit of French patent application number 1756352, the contents of which is hereby incorporated herein by reference in its entirety to the maximum extent allowable by law.

FIELD

The present disclosure relates to the field of 3D circuit designs, and in particular to a method and computing device for generating a 3D circuit layout from a 2D circuit layout.

BACKGROUND

During the conception of an integrated circuit comprising millions of transistors, a key phase of the design process is the operation known as "place and route". During this operation, a GDS (graphic database system) file of the circuit design is generated by a dedicated conception tool prior to fabrication. The conception tool first places the cells of the circuit design on the available surface of the integrated circuit, and then a routing algorithm is applied that interconnects the cells of the circuit design in order to create a circuit layout.

3D circuits, in which cells are positioned on multiple stacked levels interconnected by 3D vias, provide many advantages in terms of circuit compactness and performance. For example, monolithic 3D transistor technology, also known as sequential 3D and CoolCube™, involves the fabrication of a plurality of layers of transistors as a single block. In particular, two or more layers or tiers of transistors are formed sequentially, and interconnected by vertical 3D vias. For example, this technology is described in more detail in the publication by P. Batude et al. entitled "3D sequential integration opportunities and technology optimization", IEEE International Interconnect Technology Conference, 2014, pages 373-376. An advantage of monolithic 3D technology with respect to other 3D technologies is that the process allows a high density of interconnections (small size and spacing of the vias) when compared with TSVs (Through-Silicon-Vias) or face-to-face contact (copper to copper). Furthermore, 3D fabrication processes that involve stacking two or more integrated circuits suffer from problems of alignment, contrary to the monolithic 3D approach in which the device is fabricated sequentially.

A problem for 3D circuit design is that existing software tools implementing place and route have been developed for 2D circuits, and are not compatible with the generation of high-density 3D circuit designs. Furthermore, creating a new design tool configured for 3D circuit design would be time consuming and costly.

There is this a need in the art for a circuit design method and device permitting the conception of 3D circuits having relatively high density.

SUMMARY

It is an aim of embodiments of the present description to at least partially address one or more needs in the prior art.

According to one aspect, there is provided a method of generating, by a computing device, a 3D circuit layout based on a 2D circuit layout, the method comprising: performing, by the computing device, a placement operation on a 2D circuit design to generate a 2D circuit layout comprising R rows of circuit cells, where R is an integer equal to at least three; assigning, by the computing device, some of the circuit cells of a first group of circuit cells of the 2D circuit layout to one or more first rows of a first level of the 3D circuit layout and some of the circuit cells of the first group of circuit cells to one or more second rows of a second level of the 3D circuit layout; assigning, by the computing device, some of the circuit cells of a second group of circuit cells of the 2D circuit layout to one or more second rows of the first level of the 3D circuit layout and some of the circuit cells of the second group of circuit cells to one or more second rows of the second level of the 3D circuit layout, wherein the assignment of each circuit cell of the first and second groups is performed by: selecting, among at least one of the first rows and at least one of the second rows, the row having the greatest available space; and assigning the circuit cell to the selected row; and transmitting the 3D circuit layout to a manufacturing plant for fabrication.

According to one embodiment, each of the first and second levels of the 3D circuit layout initially has a same number of rows as the 2D circuit layout, and each cell of the first group of circuit cells is assigned to a corresponding row of the first or second level.

According to one embodiment, the method further comprises, after assigning all of the circuit cells of the 2D circuit layout to levels of the 3D circuit layout: reducing the number of rows of the first level of the 3D circuit layout by emptying the circuit cells from at least one row and suppressing the at least one row, the emptied circuit cells being moved to either of the rows adjacent to the emptied row in the first level; and reducing the number of rows of the second level of the 3D circuit layout by emptying the circuit cells from at least one row and suppressing the at least one row, the emptied circuit cells being moved to one or two rows adjacent to the emptied row in the second level.

According to one embodiment, emptying the circuit cells to reduce the number of rows of the first level comprises moving the cells from the row to be emptied of the first level in the opposite order to an order in which the cells were added to the row to be emptied of the first level; and emptying the circuit cells to reduce the number of rows of the second level comprises moving the cells from the row to be emptied of the second level in the opposite order to an order in which the cells were added to the row to be emptied of the second level.

According to one embodiment, the step of selecting, among at least one of the first rows and at least one of the second rows, the row having the greatest available space, comprises comparing the available space in all of the rows of the first and second levels and selecting the row having the most available space.

According to one embodiment, each of the circuit cells is comprised of a plurality of sub-cells.

According to one embodiment, the method further comprises assigning one or more specific circuit cells to the second level or to a higher level of the 3D circuit layout, the one or more specific circuit cells corresponding to zones for forming vias to lower levels of the 3D circuit layout.

According to one embodiment, the method further comprises, before the assigning operations, initially assigning one or more circuits of the 2D circuit layout to one or more levels of the 3D circuit layout.

According to a further aspect, there is provided a computer readable storage medium storing computer instructions that implement the above method when executed by a computing device.

According to a further aspect, there is provided a computing device for generating a 3D circuit layout based on a 2D circuit layout, the computing device comprising: one or more memory devices storing the 2D circuit layout; and a processing device configured to: perform a placement operation on a 2D circuit design to generate a 2D circuit layout comprising R rows of circuit cells, where R is an integer equal to at least three; assign some of the circuit cells of a first group of circuit cells of the 2D circuit layout to one or more first rows of a first level of the 3D circuit layout and some of the circuit cells of the first group of circuit cells to one or more second rows of a second level of the 3D circuit layout; assign some of the circuit cells of a second group of circuit cells of the 2D circuit layout to one or more second rows of the first level of the 3D circuit layout and some of the circuit cells of the second group of circuit cells to one or more second rows of the second level of the 3D circuit layout, wherein the computing device is configured to assign each circuit cell of the first and second groups by: selecting, among at least one of the first rows and at least one of the second rows, the row having the greatest available space; and assigning the circuit cell to the selected row; and transmit the 3D circuit layout to a manufacturing plant for fabrication.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

As used herein, the term "around", preceding a value, is used to indicate a tolerance of plus or minus 10 percent of the value in question.

Figure 1:
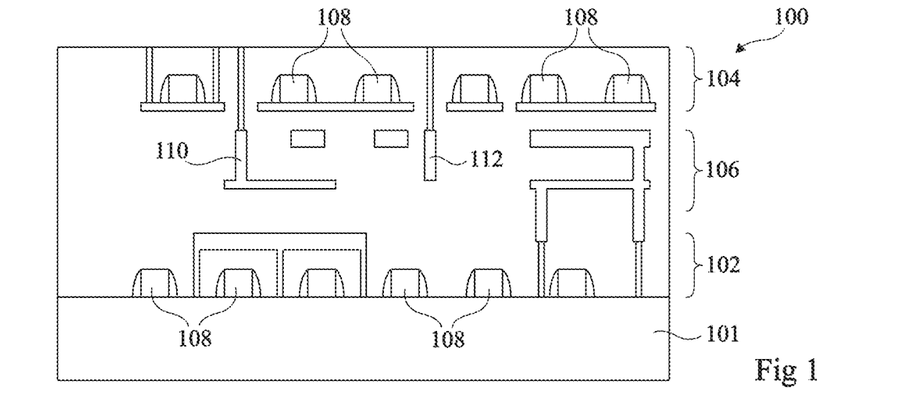
FIG. 1 is a cross-section view of a monolithic 3D circuit according to an example embodiment.

FIG. 1 is a cross-section view of a monolithic 3D circuit 100 according to an example embodiment. The circuit 100 for example comprises a transistor level 102 formed on a handle layer 101, and a further transistor level 104 superposed over the transistor level 102. An intermediate metal interconnection layer 106 for example serves to provide interconnections between transistor devices 108 of the levels 102, 104. While not illustrated in FIG. 1, a further metal interconnection layer could be provided above the transistor level 104. Examples of 3D vias 110, 112 are also illustrated, known as a monolithic inter-tier vias (MIV).

A monolithic inter-tier via has the advantage of being of significantly smaller dimensions than a TSV (Through-Silicon-Via). For example, while a TSV typically has a diameter of around 1000 times that of a transistor, an MIV for example has a diameter of the same order of magnitude as that of the vias in the metal layer, for example of around 40 nm for 14 nm technology, or more generally a diameter of between 35 and 120 nm.

Figure 2A:
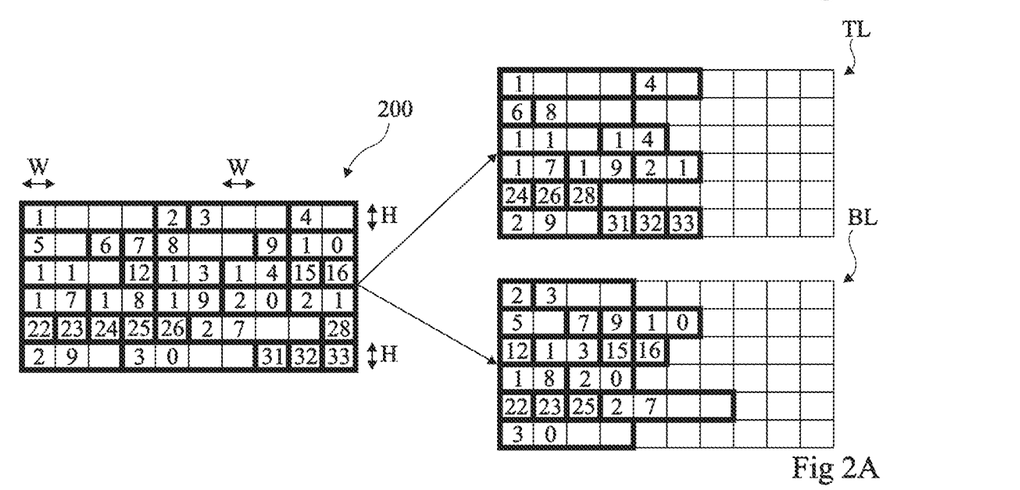
FIG. 2A represents an assignment phase for assigning cells of a 2D circuit design to levels of a 3D circuit design.
Figure 2B:
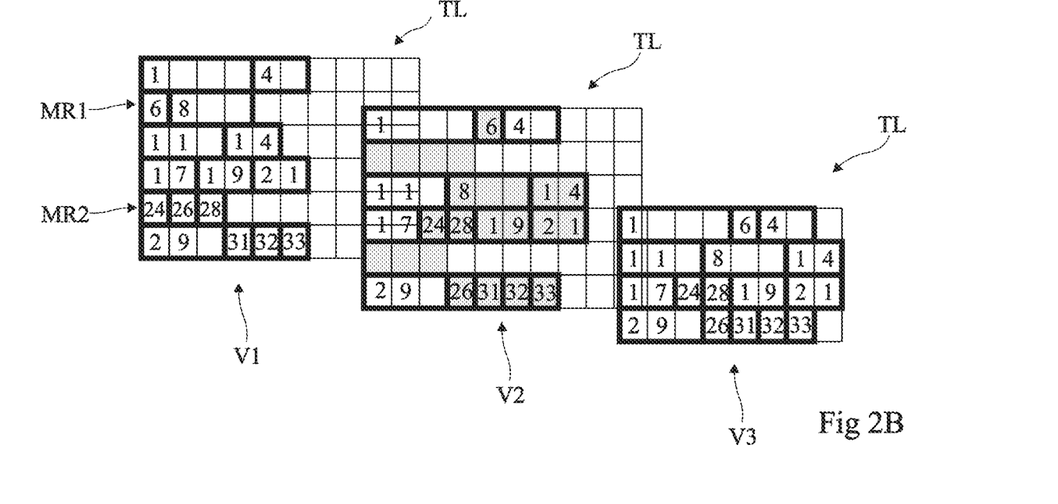
FIGS. 2B and 2C represent a row reduction operation according to example embodiment of the present disclosure.
Figure 2C:
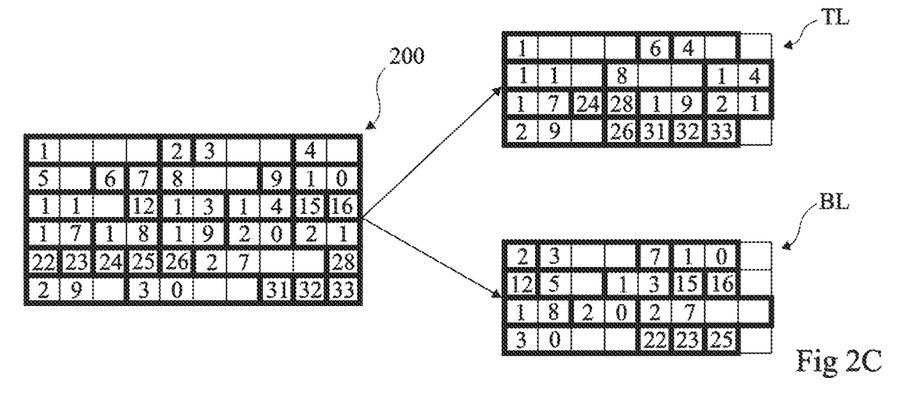

FIGS. 2A to 2C represent plan views of circuit layouts during a method of conception of a 3D circuit, such as a monolithic 3D circuit, according to example embodiment of the present disclosure. This design process is for example implemented by a suitable computing device, such as the one of FIG. 3, as will now be described.

Figure 3:
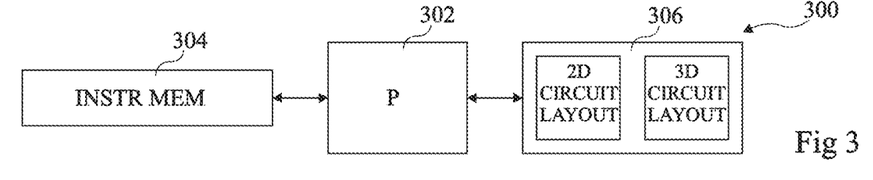
FIG. 3 schematically illustrates a computing device according to an example embodiment of the present disclosure.

FIG. 3 schematically illustrates a computing device 300 adapted to implement a method of 3D circuit conception. The device 300 for example comprises one or more processors (P) 302 under control of instructions stored in an instruction memory (INSTR MEM) 304. A memory 306 for example stores a 2D circuit layout (2D CIRCUIT LAYOUT), and a 3D circuit layout (3D CIRCUIT LAYOUT) generated based on the 2D circuit layout. The memories 304 and 306 could be implemented in a same memory device or in separate memory devices. Of course, while not represented in FIG. 3, the computing device 300 could additionally comprise one or more user input devices, such as a keyboard, mouse, etc., one or more output devices such as a display, and/or a communications interface permitting the generated 3D circuit layout to be transmitted to a manufacturing plant for fabrication.

The operations represented in FIGS. 2A to 2C will now be described with reference to FIG. 4.

Figure 4:
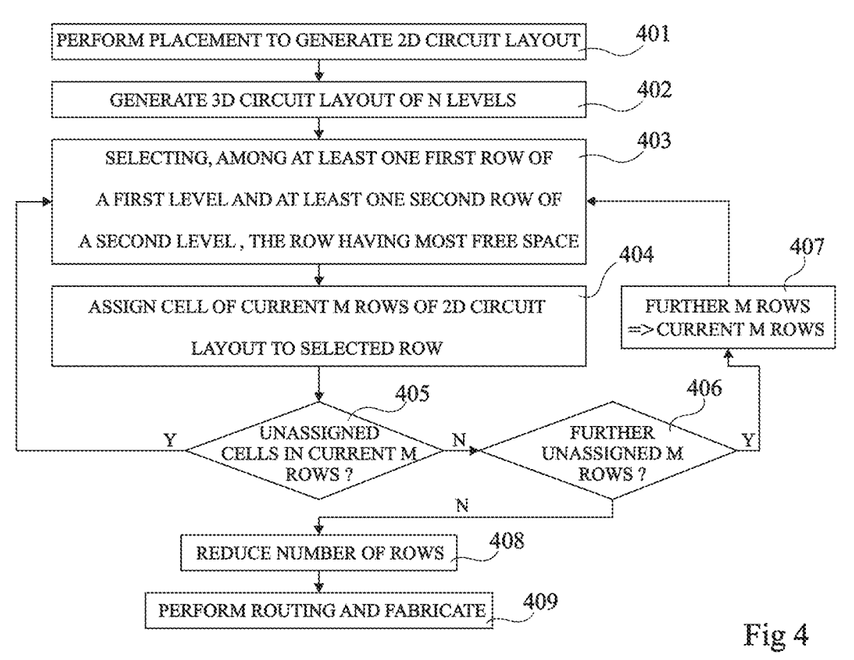
FIG. 4 is a flow diagram illustrating operations in a method of generating a 3D circuit layout according to an example embodiment of the present disclosure.

FIG. 4 is a flow diagram illustrating operations in a method of conception of a 3D circuit according to an embodiment of the present disclosure. The method is for example implemented by the device of FIG. 3.

In an operation 401, placement is performed to generate a 2D circuit layout. In some embodiments, the 2D circuit layout is represented by a GDS file, although other file formats could be used. As represented in FIG. 2A, a 2D circuit layout 200 is for example generated using a placement operation, corresponding to a first phase of a place and route operation. In the example embodiments described herein, the 2D circuit layout 200 comprises 33 standard cells numbered "1" to "33". Rows 1 to 6 of the 2D circuit layout respectively comprise: the cells "1" to "4"; the cells "5" to "10"; the cells "11" to "16"; the cells "17" to "21"; the cells "22" to "28"; and the cells "29" to "33". Each of the standard cells for example has equal height H, but varying widths. In the example of FIG. 2A, these standard cells are arranged in 6 rows of equal height H.

Furthermore, the 2D circuit layout 200 is for example formed of columns and rows of elementary sites, each elementary site being of the same height H and a same width W. Each of the standard cells occupies an integer number of these elementary sites in the row direction. In the example of FIG. 2A, the 2D circuit layout has a width equal to 10 elementary sites, with each standard cell having a width of between 1 and 4 elementary sites, in other words a width of between W and 4W. In the example of FIG. 2A, the cells "1", "27" and "30" have a width of 4 elementary sites, the cells "3", "8", "11" and "29" have a width of 3 elementary sites, the cells "4", "5", "10", "13", "14" and "17" to "21" have a width of 2 elementary sites, and the remaining cells have a width of a single elementary site.

Of course, in alternative embodiments, the 2D circuit layout could have different dimensions, and comprise a different number of standard cells, for example hundreds or thousands of standard cells.

With reference again to FIG. 4, in an operation 402, an empty 3D circuit layout of N levels is for example generated, where N is for example an integer equal to 2 or more. For example, each level initially has a same number of rows as the 2D circuit layout 200, and each row for example has the same number of elementary sites as the rows of the 2D circuit layout 200.

In an operation 403, a selection is made, among at least one first row of a first of the levels of the 3D circuit layout and at least one second row of a second of the levels of the 3D circuit layout, of the row having the most available free space, in other words the most number of free elementary sites.

In an operation 404, a cell of a current M rows of the 2D circuit layout is then assigned to the row selected in operation 403, where M is a positive integer, and is for example equal to between 1 and 10. The M rows are for example successive rows of the 2D circuit layout.

In an operation 405, it is then determined whether there are further unassigned cells in the current M rows of the 2D circuit layout, and if so, operations 403 and 404 are repeated. If not, in an operation 406, it is determined whether there is an unassigned group of M rows in the 2D circuit layout, and if so, in an operation 407 the current M rows is updated to be the further unassigned M rows, and operations 403 to 405 are repeated until all cells of all rows of the 2D circuit layout have been assigned to rows of the 3D circuit layout.

An example of the cell assignment of operations 403 to 407 is represented in FIG. 2A. In the example of FIG. 2A, the 3D circuit layout comprises two levels, a top level TL and a bottom level BL. However, the 3D circuit design method described herein could be used to generate 3D circuit designs having any number of levels. Initially, each level TL, BL of the 3D circuit layout for example has the same dimensions as the 2D circuit layout. Furthermore, in the example of FIG. 2A, M is equal to 1, and each cell of each row of the 2D circuit layout is assigned to one or the other of a corresponding row in the top level TL and a corresponding row in the bottom level BL.

For example, cells of the 2D circuit layout 200 are assigned row by row starting with the top row in the figure, and the rows are processed from left to right. The assignment algorithm for example involves assigning a cell in a row r of the 2D circuit layout to a corresponding row r of the top level TL or bottom level BL based on which of these rows has the most available elementary sites, in other words the fewest occupied elementary sites. In the case that the number of occupied elementary sites of the rows r of the top and bottom levels are equal, priority is for example given to one of the levels, and to the top level in the example of the first row of FIG. 2A.

Thus it can be seen in the example of FIG. 2A that the standard cells "1" and "4" of row 1 of the 2D circuit layout 200 are assigned to row 1 of the top level TL, and the standard cells "2" and "3" of row 1 of the 2D circuit layout 200 are assigned to row 1 of the bottom level BL. Furthermore, the cells "6" and "8" of row 2 of the 2D circuit layout are assigned to row 2 of the top level TL, and the cells "5", "7", "9" and "10" are assigned to row 2 of the bottom level BL.

With reference again to FIG. 4, if in operation 406 it is determined that there are no more unassigned rows in the 2D circuit design, the next operation is an operation 408.

In operation 408, the number of rows in each level of the 3D circuit layout is for example reduced. However, as described in more detail below, depending on how row assignment is performed, in some cases row reduction is not needed.

FIG. 2B represents an example of a row reduction phase for the top and bottom levels represented in FIG. 2A, and in which the number of rows of the top and bottom levels of the 3D circuit layout is reduced from 6 to 4. More generally, the number of rows is for example reduced by around a third in the case that there are two levels in the 3D circuit layout. This is for example achieved by grouping the rows of each level in groups of three adjacent rows, and emptying the cells from the middle row of each group, allowing the emptied middle row to then be suppressed.

FIG. 2B represents the row reduction applied to the top level TL. A first view V1 of the top level TL corresponds to the arrangement of cells following the level assignment of FIG. 2A.

Row emptying is for example performed based on the following algorithm:
  for each row to be emptied, the standard cells are for example processed from right to left, or more generally in the opposite order to the order in which the cells were added to the row, in other words in an order from right to left in the case that the cells were added to the row in an order from left to right;
  the right-most cell (or left-most cell if the row to be emptied was filled from right to left) of the row is moved to a destination row corresponding to the adjacent row of the group having the fewest occupied elementary sites;
  if in the destination row there is no standard cell occupying an elementary site in a same column as the cell to be moved, the cell is for example moved to a position after the right-hand cell of the row (or before the left-hand cell of the row if the row to be emptied was filled from right to left);
  if in the destination row there is an existing standard cell occupying an elementary site in a same column as the cell to be moved, the cell is for example inserted to the right of the existing standard cell (or to the left if the row to be emptied was filled from right to left), and any other standard cells to the right of the existing standard cell are shifted to the right by the number of elementary sites of the new cell to make room for the new cell (or, if the row to be emptied was filled from right to left, any other standard cells to the left of the existing standard cell are shifted to the left by the number of elementary sites of the new cell).

For example, as represented in FIG. 2B, the middle row MR1 of the first group of three rows, which is row 2 of the top level TL, is emptied by inserting the standard cell "8" between the standard cells "11" and "14" in row 3 of the top level TL, and by inserting the standard cell "6" between the standard cells "1" and "4" in row 1 of the top level TL. The middle row MR2 of the second group of three rows is emptied in a similar fashion.

A view V2 in FIG. 2B illustrates the top level TL once all of the middle rows have been emptied. Thus, in the example of FIG. 2B, the rows MR1 and MR2 are empty. These empty rows are then for example removed entirely by bringing together the occupied rows, as shown by a view V3 in FIG. 2B. Furthermore, empty columns of elementary sites are also for example removed.

FIG. 2C illustrates both the top level TL and bottom level BL resulting from the cell assignment and row reduction phases of FIGS. 2A and 2B. The resulting 3D circuit comprises, in each level, standard cells occupying two-thirds the number of rows of the original 2D circuit layout, and for example between 60 and 80 percent of the width of the original 2D circuit layout. Furthermore, the cells that were close in the original 2D circuit layout remain close, either in the same level, or in an adjacent level, in the 3D circuit layout.

With reference again to FIG. 4, after operation 408, in an operation 409, routing is for example performed between the circuit cells of each level and between the levels of the 3D circuit layout. Furthermore, a 3D circuit in accordance with the 3D circuit layout is then for example fabricated. For example, files defining the 3D circuit layout are transmitted to a manufacturing plant such that 3D circuits may be fabricated based on the circuit layout. These files for example include a GDS file representing the 3D circuit layout.

While in the example of FIGS. 2A to 2C the method is applied to standard cells, more generally the method could be applied to circuit cells, each circuit cell corresponding to a single standard cell, or to a group of more than one standard cell. The circuit cells for example have a common height, e.g. a height equal to a same integer number of elementary sites.

Furthermore, while in the example of FIGS. 2A to 2C the cells of the top level and bottom level have the same height and width as the corresponding cells of the 2D circuit layout, in alternative embodiments the cells of the top level could be enlarged with respect to those of the bottom level in order to provide additional room for forming vertical 3D vias, for example of the type described in the U.S. Pat. No. 8,710,671. Additionally or alternatively, during assignment of circuit cells to the first and second levels of the 3D circuit design, one or more additional specific circuit cells could be assigned to the second level and/or to higher levels of the 3D circuit layout, these specific circuit cells corresponding to zones in which vias to lower levels can be formed.

Furthermore, while in the method of FIG. 4 each of the levels of the 3D circuit layout is empty before the cell assignment operations 403 to 407, in alternative embodiments one or more circuits of the 2D circuit layout are placed on a corresponding level before the assignment operations. For example, it may be decided that certain macros, such as a memory or other IP, or a packet of standard cells, should be assigned to a certain level rather than having their standard cells divided between levels. The assignment operations then proceed while taking into account the fact that some rows already have occupied elementary sites.

While the method of FIG. 4 involves the conception of a 3D circuit layout having two levels, the method could equally be applied for generating 3D circuit layouts having a greater number of levels, as will now be described with reference to FIG. 5.

Figure 5:
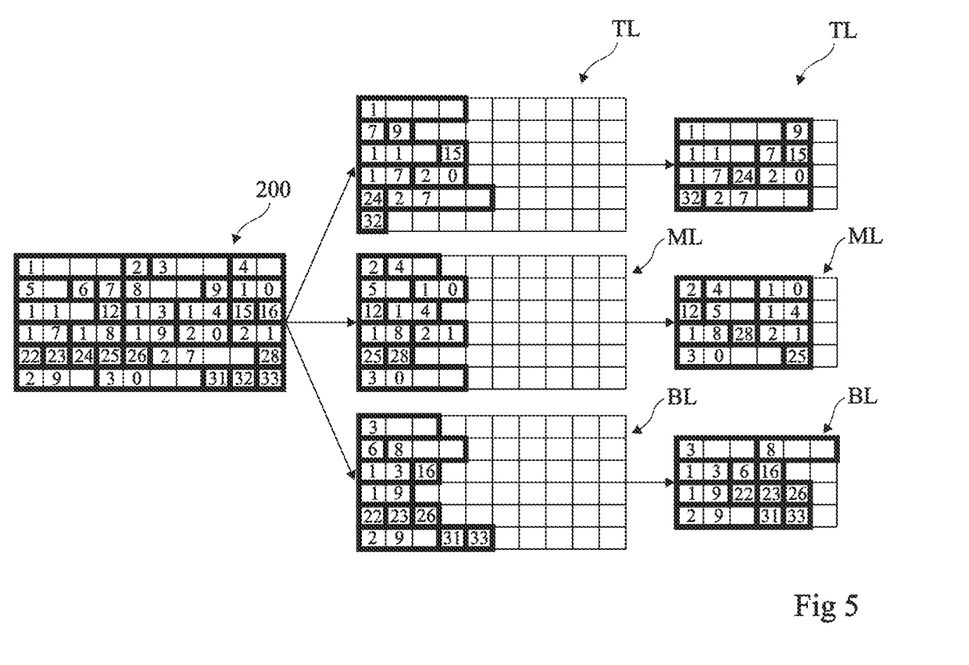
FIG. 5 represents the generation of a 3D circuit layout having 3 levels according to an example embodiment of the present disclosure.

FIG. 5 illustrates an example in which the method of FIG. 4 is applied to generate, based on the same 2D circuit layout 200 of FIG. 2A, a 3D circuit layout having three levels, a top level TL, a middle level ML, and a bottom level BL. This is achieved using the method described above in relation to FIG. 4 in which the cell assignment operations 402 and 403 involve assigning cells to each of three levels rather than two levels.

Other numbers of levels would also be possible by applying a combination of the two level and three level solution. In particular, the rows of the 2D circuit layout are for example grouped into a number of two level and three level groups, and a two level or three level approach is then applied to each group.

While in the embodiments of FIGS. 2A to 2C and FIG. 5 the cells of the 2D circuit design are assigned to the levels of the 3D circuit one row at a time, in alternative embodiments, a plurality of rows could be processed at a time, as will now be described with reference to FIG. 6.

Figure 6:
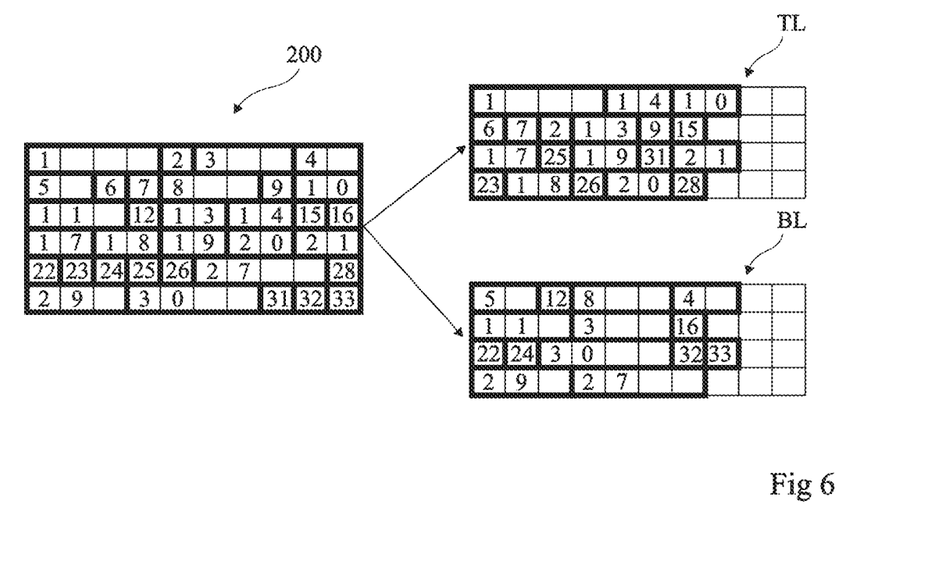
FIG. 6 represents generation of a 3D circuit layout according to a further example embodiment present disclosure.

FIG. 6 is based on the same 2D circuit layout 200 as used in the previous embodiments. However, in this example, the 3D circuit layout is generated by filling up top and bottom levels already having a reduced number of rows with respect to the 2D circuit layout. In the example of FIG. 6, the top and bottom levels each has just 4 rows. In this embodiment, the cells of the 2D circuit design are for example assigned in groups of three rows, in other words the parameter M of operation 404 of FIG. 4 is equal to 3. The cells are for example assigned by assigning the remaining cell that is most to the left and closest to the top of the group of M rows. Thus the cells in the first three rows of the layout 200 are for example assigned in the order "1", "5", "6", "7", etc. through to "16". Each cell is for example assigned to one of the first two rows of the top level TL or one of the top two rows of the bottom level BL based on the row having the most available elementary sites. In case the number of available elementary sites is equal between two or more of the rows, preference is for example given in the following order, from highest to lowest: first row of top level; first row of bottom level; second row of top level; second row of bottom level.

Thus it can be seen that, in the example of FIG. 6, the row reduction is performed at the same time as the cell assignment, and the row reduction operation 408 of FIG. 4 can thus for example be omitted.

While in the above examples the standard cells are assigned one cell at a time, in alternative embodiments, the cells could be processed in groups of cells, as will now be described in more detail with reference to FIGS. 7A and 7B.

Figure 7A:
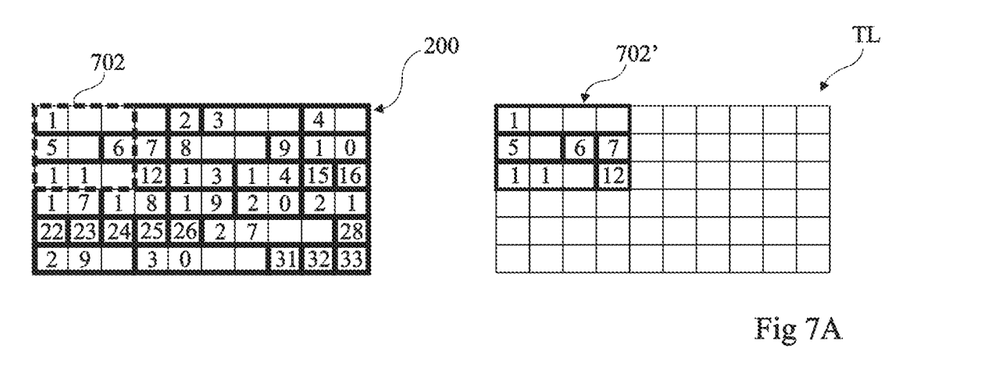
FIGS. 7A and 7B represent generation of a 3D circuit layout according to yet a further example embodiment of the present disclosure.

FIG. 7A illustrates an example of a first cell assignment operation. The example is based on the same 2D circuit layout 200 as in previous examples. However, the cells "1" to "33" of the 2D layout are now considered to be sub-cells of larger cells. A dashed rectangle 702 for example designates a zone corresponding to a default size of each of the cells to be defined. This zone initially designates a first cell having several sub-cells "1", "5", "6" and "11" falling therein. Furthermore, all sub-cells having at least one elementary site falling within the rectangle 702 are for example considered to form part of the cell. Thus, as shown in the top level TL in FIG. 7A, the rectangle 702 is for example enlarged to form a cell 702' including the whole of cell "1", and also including the cells "7" and "12". Further cells are then for example defined in a similar manner.

Figure 7B:
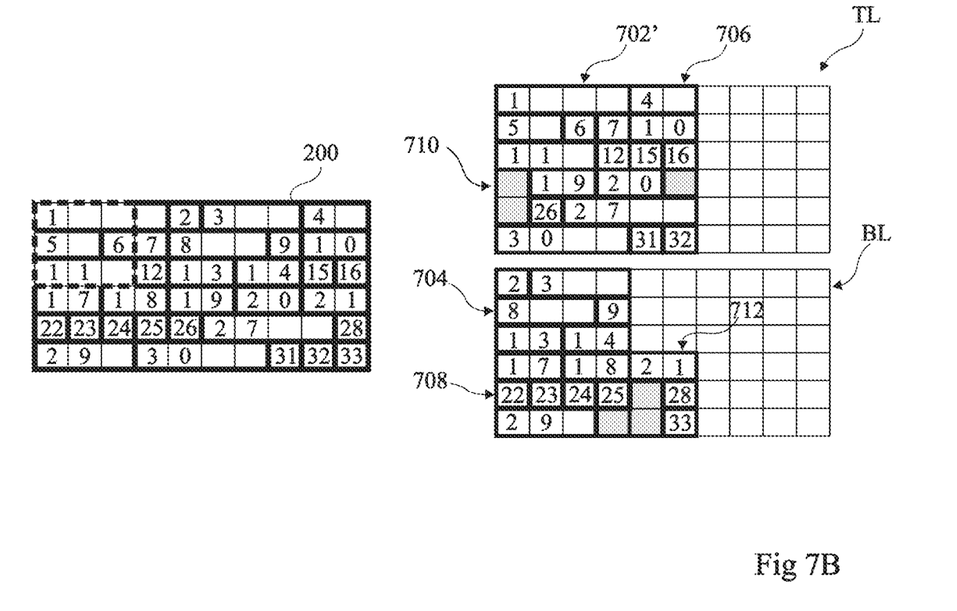

FIG. 7B illustrates top level TL and bottom level BL following several further cell assignments. In particular, a cell 704 consisting of sub-cells "2", "3", "8", "9", "13" and "14" is for example assigned to the bottom level BL; a cell 706 consisting of sub-cells "4", "10", "15" and "16" is for example assigned to the top level TL to the right of the cell 702'; a cell 708 consisting of the sub-cells "17", "18", "22" to "25" and "29" is for example assigned to the bottom level below the cell 704; a cell 710 consisting of the sub-cells "19", "20", "26", "27" and "30" to "32" is for example assigned to the top level below the cell 702'; and a cell 712 consisting of the sub-cells "21", "28" and "33" is for example assigned to the bottom level to the right of the cell 708.

It will be noted in FIG. 7B that all of the cells 702' to 712 for example have the same height of three elementary sites, and thus a row in this embodiment can be considered to have a height of three elementary sites. Furthermore, each level of the 3D circuit layout includes several empty elementary sites in view of the non-rectangular form of some of the cells.

An advantage of the embodiments described herein is that a 3D circuit layout can be generated by adapting a 2D layout produced using a standard placement algorithm, and while maintaining a form factor that is relatively close to the original. Indeed, other processes for assigning circuit cells to levels of the 3D circuit layout could lead to uneven distribution of the circuit cells among the various rows.

Furthermore, in the example of FIGS. 2A, 2B and 5, by assigning cells of the 2D layout to corresponding rows of the levels of the 3D circuit layout, relatively low wire lengths resulting from the 2D placement can be maintained in the 3D circuit design.

Furthermore, when emptying rows as described in relation with FIG. 2C, an advantage of emptying the circuit cells from the row to be emptied in an order opposite to the order that the circuit cells were added to the row to be emptied is that this minimizes the number of circuit cells of adjacent rows that are to be moved in order to make room for the circuit cells of the row to be emptied. Thus this leads to a gain in terms of processing time.

Having thus described at least one illustrative embodiment, various alterations, modifications and improvements will readily occur to those skilled in the art. For example, while examples have been described in which the final 3D circuit layout comprises two or three transistor levels, it will be apparent to those skilled in the art that the principles described herein could be applied to the generation of 3D circuit layouts having any number of transistor levels.

Furthermore, while the examples described herein are based on monolithic 3D transistor technology, it will be apparent to those skilled in the art that the techniques described herein could be applied to other technologies used for forming 3D circuits having two or more transistor levels.

The invention claimed is:

1. A method of generating, by a computing device, a 3D circuit layout based on a 2D circuit layout, the method comprising:
performing, by the computing device, a placement operation on a 2D circuit design to generate a 2D circuit layout comprising R rows of circuit cells, where R is an integer equal to at least three;
assigning, by the computing device, some of the circuit cells of a first group of circuit cells of the 2D circuit layout to one or more first rows of a first level of the 3D circuit layout and some of the circuit cells of the first group of circuit cells to one or more first rows of a second level of the 3D circuit layout, the first group corresponding to the circuit cells of a first row of the 2D circuit layout, or to the circuit cells of a plurality of first successive rows of the 2D circuit layout; and
assigning, by the computing device, some of the circuit cells of a second group of circuit cells of the 2D circuit layout to one or more second rows of the first level of the 3D circuit layout and some of the circuit cells of the second group of circuit cells to one or more second rows of the second level of the 3D circuit layout, the second group corresponding to the circuit cells of a second row of the 2D circuit layout, or to the circuit cells of a plurality of second successive rows of the 2D circuit layout, wherein the assignment of each circuit cell of the first and second groups is performed by:
selecting, among at least one of the first rows of the 3D circuit layout and at least one of the second rows of the 3D circuit layout, the row having the greatest available space; and
assigning the circuit cell only to the selected row and not to any other row of the first and second levels of the 3D circuit layout.

2. The method of claim 1, wherein each of the first and second levels of the 3D circuit layout initially has a same number of rows as the 2D circuit layout, and each cell of the first group of circuit cells is assigned to a corresponding row of the first or second level.

3. The method of claim 2, further comprising, after assigning all of the circuit cells of the 2D circuit layout to levels of the 3D circuit layout:
reducing the number of rows of the first level of the 3D circuit layout by emptying the circuit cells from at least one row and suppressing the at least one row, the emptied circuit cells being moved to either of the rows adjacent to the emptied row in the first level; and
reducing the number of rows of the second level of the 3D circuit layout by emptying the circuit cells from at least one row and suppressing the at least one row, the emptied circuit cells being moved to one or two rows adjacent to the emptied row in the second level.

4. The method of claim 3, wherein:
emptying the circuit cells to reduce the number of rows of the first level comprises moving the cells from the row to be emptied of the first level in the opposite order to an order in which the cells were added to the row to be emptied of the first level; and
emptying the circuit cells to reduce the number of rows of the second level comprises moving the cells from the row to be emptied of the second level in the opposite order to an order in which the cells were added to the row to be emptied of the second level.

5. The method of claim 1, wherein said step of selecting, among at least one of the first rows of the 3D circuit layout and at least one of the second rows of the 3D circuit layout, the row having the greatest available space, comprises comparing the available space in all of the rows of the first and second levels and selecting the row having the most available space.

6. The method of claim 1, wherein each of said circuit cells is comprised of a plurality of sub-cells.

7. The method of claim 1, further comprising, during said assignment operations, assigning one or more specific circuit cells to the second level or to a higher level of the 3D circuit layout, the one or more specific circuit cells corresponding to zones for forming vias to lower levels of the 3D circuit layout.

8. The method of claim 1, further comprising, before said assigning operations, initially assigning one or more circuits of the 2D circuit layout to one or more levels of the 3D circuit layout.

9. The method of claim 1, further comprising transmitting the 3D circuit layout to a manufacturing plant for fabrication.

10. A computer readable storage medium storing computer instructions that implement the method of claim 1 when executed by a computing device.

11. A computing device for generating a 3D circuit layout based on a 2D circuit layout, the computing device comprising:
one or more memory devices storing the 2D circuit layout; and a processing device configured to:
perform a placement operation on a 2D circuit design to generate a 2D circuit layout comprising R rows of circuit cells, where R is an integer equal to at least three;
assign some of the circuit cells of a first group of circuit cells of the 2D circuit layout to one or more first rows of a first level of the 3D circuit layout and some of the circuit cells of the first group of circuit cells to one or more first rows of a second level of the 3D circuit layout, the first group corresponding to the circuit cells of a first row of the 2D circuit layout, or to the circuit cells of a plurality of first successive rows of the 2D circuit layout; and
assign some of the circuit cells of a second group of circuit cells of the 2D circuit layout to one or more second rows of the first level of the 3D circuit layout and some of the circuit cells of the second group of circuit cells to one or more second rows of the second level of the 3D circuit layout, the second group corresponding to the circuit cells of a second row of the 2D circuit layout, or to the circuit cells of a plurality of second successive rows of the 2D circuit layout, wherein the computing device is configured to assign each circuit cell of the first and second groups by:
selecting, among at least one of the first rows of the 3D circuit layout and at least one of the second rows of the 3D circuit layout, the row having the greatest available space; and
assigning the circuit cell only to the selected row and not to any other row of the first and second levels of the 3D circuit layout.

12. The computing device of claim 11, wherein the processing device is further configured to generate each of the first and second levels of the 3D circuit layout to initially have a same number of rows as the 2D circuit layout.

13. The computing device of claim 12, wherein the processing device is further configured, after assigning all of the circuit cells of the 2D circuit layout to levels of the 3D circuit layout, to:
reduce the number of rows of the first level of the 3D circuit layout by emptying the circuit cells from at least one row and suppressing the at least one row, the emptied circuit cells being moved to either of the rows adjacent to the emptied row in the first level; and
reduce the number of rows of the second level of the 3D circuit layout by emptying the circuit cells from at least one row and suppressing the at least one row, the emptied circuit cells being moved to one or two rows adjacent to the emptied row in the second level.

14. The computing device of claim 13, wherein the processing device is configured:
to empty the circuit cells to reduce the number of rows of the first level by moving the cells from the row to be emptied of the first level in the opposite order to an order in which the cells were added to the row to be emptied of the first level; and
to empty the circuit cells to reduce the number of rows of the second level by moving the cells from the row to be emptied of the second level in the opposite order to an order in which the cells were added to the row to be emptied of the second level.

15. The computing device of claim 11, wherein the processing device is further configured to assign one or more specific circuit cells to the second level or to a higher level of the 3D circuit layout, the one or more specific circuit cells corresponding to zones for forming vias to lower levels of the 3D circuit layout.

* * * * *